US011304125B2

(12) United States Patent
Casati

(10) Patent No.: US 11,304,125 B2
(45) Date of Patent: Apr. 12, 2022

(54) METHOD AND APPARATUS FOR SUPPORTING MIGRATION AND CO-EXISTENCE OF PUBLIC LAND MOBILE NETWORK BASED ON USER EQUIPMENT CAPABILITY IDENTIFICATIONS

(71) Applicant: Nokia Technologies Oy, Espoo (FI)

(72) Inventor: Alessio Casati, West Molesey (GB)

(73) Assignee: NOKIA TECHNOLOGIES OY, Espoo (FI)

( * ) Notice: Subject to any disclaimer, the term of this patent is extended or adjusted under 35 U.S.C. 154(b) by 0 days.

(21) Appl. No.: 16/863,794

(22) Filed: Apr. 30, 2020

(65) Prior Publication Data

US 2020/0351762 A1 Nov. 5, 2020

Related U.S. Application Data

(60) Provisional application No. 62/842,109, filed on May 2, 2019.

(51) Int. Cl.
*H04W 48/16* (2009.01)
*H04W 8/08* (2009.01)
(Continued)

(52) U.S. Cl.
CPC ............ *H04W 48/16* (2013.01); *H04W 8/08* (2013.01); *H04W 8/24* (2013.01); *H04W 60/00* (2013.01); *H04W 76/11* (2018.02); *H04W 84/042* (2013.01)

(58) Field of Classification Search
CPC ......... H04W 8/24; H04W 8/06; H04W 60/00; H04W 12/00; H04W 84/04; H04W 60/04;
(Continued)

(56) References Cited

U.S. PATENT DOCUMENTS

2013/0254395 A1\* 9/2013 Chen et al. ............. 709/225
2014/0080478 A1\* 3/2014 Costelloe ............... 455/423
(Continued)

OTHER PUBLICATIONS

"New SID: Study on Optimisations on UE Radio Capability Signalling", TSG SA Meeting #SP-80, SP-180599, Agenda: 19, Nokia, Jun. 13-15, 2018, 3 pages.
(Continued)

*Primary Examiner* — Meless N Zewdu
(74) *Attorney, Agent, or Firm* — Alston & Bird LLP

(57) ABSTRACT

A method, apparatus and computer program product are provided for intelligently switching from public land mobile network (PLMN) assigned identification (ID) to UE manufacturer assigned ID. An example method includes receiving a registration request message comprising information related to location registration to an access and mobility management function (AMF) or a mobility management entity (MME) through a radio access network (RAN), obtaining an international mobile equipment identity (IMEI) or Permanent Equipment Identifier (PEI) of a user equipment and extracting from the IMEI or PEI a type allocation code (TAC). The method then obtains a user equipment radio capability ID associated with the user equipment and determines whether the UE shall use a user equipment manufacturer ID or PLMN assigned ID in order to determine an appropriate registration accept message having instructions to operate based on the user equipment manufacturer ID or the PLMN assigned ID.

20 Claims, 9 Drawing Sheets

(51) Int. Cl.
*H04W 8/24* (2009.01)
*H04W 60/00* (2009.01)
*H04W 76/11* (2018.01)
*H04W 84/04* (2009.01)

(58) Field of Classification Search
CPC ..... H04W 76/11; H04W 84/042; H04W 8/08; H04W 48/16; H04W 8/18; H04W 8/00; H04W 8/02; H04W 8/005; H04W 8/04; H04W 8/10; H04W 8/12; H04W 8/14; H04W 8/20; H04W 8/082; H04W 48/12; H04W 88/00; H04W 88/02; H04W 88/08; H04W 76/10; H04W 76/00; H04W 76/16; H04W 76/18; H04W 60/06; H04W 64/00; H04W 64/003; H04W 48/00; H04W 48/02; H04W 8/065
See application file for complete search history.

(56) References Cited

U.S. PATENT DOCUMENTS

| | | | | |
|---|---|---|---|---|
| 2015/0023180 | A1* | 1/2015 | Feng | H04W 24/08 |
| 2015/0085756 | A1* | 3/2015 | Sheth et al. | H04W 8/205 |
| 2017/0194995 | A1* | 7/2017 | Evans et al. | H04B 1/3816 |
| 2019/0166526 | A1* | 5/2019 | Xu et al. | H04W 36/0033 |

OTHER PUBLICATIONS

"New SID: Study on Optimisations on UE Radio Capability Signalling—NR/E-UTRA Aspects", TSG RAN Meeting #RP-80, RP-181459, Agenda: 9.2.2, MediaTek Inc, Jun. 13-15, 2018, 4 pages.

"Reverting to Manufacturer-Assigned UE Radio Capability ID", SA WG2 Meeting #S2-132, S2-1903803, Agenda: 6.28, Intel, Apr. 8-12, 2019, pp. 1-2.

"Addressing Switch from PLMN Assigned to UE Manufacturer Assigned UE Capabilities IDS (And Back!)", SA WG2 Meeting #133, S2-190xxxx, Agenda:6.x, Nokia, May 13-17, 2 pages.

"3rd Generation Partnership Project; Technical Specification Group Services and System Aspects; System Architecture for the 5G System; Stage 2 (Release 16)", 3GPP TS 23.501, V16.0.2, Apr. 2019, pp. 1-317.

"3rd Generation Partnership Project; Technical Specification Group Services and System Aspects; General Packet Radio Service (GPRS) enhancements for Evolved Universal Terrestrial Radio Access Network (E-UTRAN) access (Release 16)", 3GPP TS 23.401, V16.2.0, Mar. 2019, pp. 1-418.

"TS.06 IMEI Allocation and Approval Process", GSM Association, V 17.0, Jun. 19, 2019, pp. 1-37.

"3rd Generation Partnership Project; Technical Specification Group Core Network and Terminals; Numbering, addressing and identification (Release 15)", 3GPP TS 23.003, V15.6.0, Dec. 2018, pp. 1-130.

"Removing Requirement that TAC+SV is used to Identify UE model in Manufacturer Assigned ID", 3GPP TSG-SA WG2 Meeting #136, S2-1912550, Nokia, Nov. 18-22, 2019, 5 pages.

"Resolution of Editor's Note on UCMF-AMF Interaction", SA WG2 Meeting #S2-136, S2-1912522, Intel, Nov. 18-22, 2019, 5 pages.

"Removing Requirement that TAC+SV is used to Identify UE model in Manufacturer Assigned ID", 3GPP TSG-SA WG2 Meeting #136, S2-1912549, Nokia, Nov. 18-22, 2019, 5 pages.

"Removing Requirement that TAC+SV is used to Identify UE model in Manufacturer Assigned ID", 3GPP TSG-SA WG Meeting #136, S2-1912513, Nokia, Nov. 18-22, 2019, 3 pages.

"Clarification on UCMF Service", SAWG2 Meeting #136, S2-1912517, OPPO, Nov. 18-22, 2019, 2 pages.

"Supporting Bulk Dictionary Entries Creation and Deletion for UCMF Service", SA WG2 Meeting #136, S2-1912518, OPPO, Nov. 18-22, 2019, 2 pages.

"3rd Generation Partnership Project; Technical Specification Group Services and System Aspects; System Architecture for the 5G System (5GS); Stage 2 (Release 16)", 3GPP TS 23.501, V16.4.0, Mar. 2020, pp. 1-430.

"3rd Generation Partnership Project; Technical Specification Group Services and System Aspects; Procedures for the 5G System (5GS); Stage 2 (Release 16)", 3GPP TS 23.502, V16.4.0, Mar. 2020, pp. 1-582.

International Search Report and Written Opinion received for corresponding Patent Cooperation Treaty Application No. PCT/FI2020/050289, dated Jul. 8, 2020, 16 pages.

"Introduction of RAGS", 3GPP TSG-SA WG2 Meeting #132, S2-1903215, OPPO, Apr. 8-12, 2019, 25 pages.

"Introduction of Radio Capabilities Signalling Optimisation Feature", 3GPP TSG-SA WG2 Meeting #132, S2-1904478, Qualcomm Incorporated, Apr. 8-12, 2019, 18 pages.

"3rd Generation Partnership Project; Technical Specification Group Services and System Aspects; Study on optimisations on UE radio capability signalling (Release 16)", 3GPP TR 23 743, V16.0.0, Mar. 2019, pp. 1-56.

"TAC Allocation as detailed in 3GPP TS 23.003", 3GPP TSG CT4 Meeting #72, 04-161219, GSM Association, Feb. 15-19, 2016, 3 pages.

Tentative Rejection received for corresponding Taiwan Patent Application No. 109114617, dated Feb. 4, 2021, 20 pages of office action and 5 pages of Translation available.

"3rd Generation Partnership Project;Technical Specification Group Services and System Aspects;Procedures for the 5G System; Stage 2 (Release 16)", 3GPP TS 23.502, V16.0.2, Apr. 2019, pp. 1-419.

Office Action for Bangladesh Application No. 148/2020/2987 dated Jun. 16, 2021, 1 page.

Notice of Allowance for Taiwanese Application No. 109114617 dated Nov. 29, 2021, 3 pages.

Office Action for Vietnamese Application No. 1-2021-06891 dated Dec. 31, 2021, 2 pages.

* cited by examiner

METHOD AND APPARATUS FOR SUPPORTING MIGRATION AND CO-EXISTENCE OF PUBLIC LAND MOBILE NETWORK BASED ON USER EQUIPMENT CAPABILITY IDENTIFICATIONS

CROSS-REFERENCE TO RELATED APPLICATIONS

This application claims priority to U.S. Provisional Application No. 62/842,109 filed May 2, 2019, which is hereby incorporated herein in its entirety by reference.

BACKGROUND

Third generation partnership project (3GPP) $5^{th}$ generation (5G) technology is a next generation of radio systems and network architecture that can deliver extreme broadband and ultra-robust, low latency connectivity. 5G technology improves a variety of telecommunication services offered to the end users, and helps to support massive broadband that delivers gigabytes of bandwidth per second on demand for both the uplink and downlink transmissions. Next generation systems, which utilize the 5G architecture, utilize virtualized radio access network (RAN) functions and core network functions.

In general, in a mobile system, a User Equipment (UE) provides the network with RAN and network UE capabilities. The size of the UE radio capabilities information such information can over time become significant. One concept used in 5G mobile networks, which is being defined in 3GPP Release 16 under the feature Optimizations of UE radio capability signaling (RACS) and is to be documented, for example but not limited to, in 3GPP technical specification (TS) 23.501, TS 23.501 and TS 23.401, is the concept of providing a centralized node such as a UE capabilities Management Function (UCMF) to allocate and store a UE capability identification (ID) that represents the radio capabilities of the UE, or to store a dictionary, provided by a UE manufacturer, the UE capability ID(s) representing the UE radio capabilities of the UE model identified by a type allocation code (TAC). The Type Allocation Code (TAC) is issued by the GSM Association in its capacity as the Global Decimal Administrator. Further information can be found in the GSMA TS.06 "IMEI Allocation and Approval Process". This UE capability ID, if allocated by the PLMN using the UCMF, is provided to the UE and stored in the UE and is also known as PLMN-assigned UE Radio Capability ID (see TS 23.501). The IDs that are stored in the UCMF and UE as defined by the UE manufacturers and associated to the UE model TAC are also known as UE manufacturer-assigned UE radio Capability ID (see TS 23.501). The mapping of the ID to the related capabilities is also cached in the core network (CN) and RAN nodes. This UE capability ID is then sent by the UE to the network in registration messages in the 5G system (5GS, see TS 23.501) or attach messages and/or in in tracking area update messages in evolved packet system (EPS, see TS 23.401) so the network is aware of the UE ratio capabilities without then inquiring the full set of capabilities thus minimizing signalling size over the radio network. The UE may be identified/associated in the network in a 5GS using a Permanent Equipment Identity (PEI) and in the EPS by using an International Mobile Equipment Identity (IMEI). The PEI and IMEI format is the same and includes the TAC of the UE model. See TS 23.003.

However, there is a problem associated with switching from a public land mobile network (PLMN) assigned ID to a UE manufacturer assigned ID. Solutions are now being investigated in 3GPP, for example, solution 1 proposes using a "flush" indication in an appropriate Non-Access-Stratum (NAS) procedure indicating to the UE that it should delete any PLMN assigned UE Capability IDs that it has for the PLMN. Accordingly, next time the UE performs the registration procedure, the UE either indicates its manufacturer assigned ID (assuming it has one) or it does not include any ID, which will trigger the network to re-acquire the UE radio access capability over the air.

One issue with this proposal is that UEs which are not configured with a manufacturer assigned ID will unnecessarily need to signal their radio access capability over the air again. Also for such UEs (with no manufacturer assigned ID) the network needs to take care to not ask the same UE more than once (e.g. by using a new ID value range for the newly assigned PLMN assigned IDs). Additionally, the "flush" indication is sent indiscriminately to all UEs, which leads to unnecessary UE radio access capability re-acquisition over the radio for UEs that do not have a manufacturer assigned IDs.

Another proposed solution 2 is built on top of solution 1, with the addition of an indicator that the UE provides to the network along with the PLMN assigned UE capability ID, indicating that the UE "also has a configured manufacturer assigned ID." Based on this additional indicator the network knows that it should send a "flush" indication only to UEs that have a configured manufacturer based ID. One issue with solution 2 is that the "flush" indication is sent only to UEs that do not have a manufacturer assigned ID for a specific set of UE radio access capabilities causing added logic complexity on the network side.

A third solution which is similar to solution 1 with the only difference being that the "flush" message is interpreted conditionally by the UE e.g. "delete a PLMN-assigned ID for this PLMN under the condition that you have a manufacturer assigned ID for the same set of UE radio access capabilities." At least one issue with solution 3 is that the "flush" indication is sent to all UEs, however, the re-acquisition of UE radio access capability over the radio is performed only for UEs that do not have a manufacturer-assigned ID.

BRIEF SUMMARY

A method, apparatus, and computer program product are provided in accordance with certain example embodiments in order to intelligently switch from a public land mobile network (PLMN) assigned identification (ID) to a UE manufacturer assigned ID. In this regard, an embodiment of the present disclosure proposes an approach that does not require a rudimentary indicator but instead provides intelligence about what UEs support the UE manufacturer capability ID in the network.

In one example embodiment, a method is provided that includes receiving, from a user equipment, a registration request message comprising information related to location registration to an access and mobility management function (AMF) or a mobility management entity (MME) through a radio access network (RAN), obtaining an international mobile equipment identity (IMEI) or permanent equipment identifier (PEI) of the user equipment and extracting a type allocation code (TAC) from the IMEI or the PEI and obtaining a user equipment radio capability identification (ID) associated with the user equipment. The registration request message indicates that the user equipment supports user equipment radio capability signaling (RACS). The user equipment radio capability ID represents the user equipment's radio access capabilities information. The method further includes determining whether the user equipment radio capability ID is a user equipment manufacturer ID or a public land mobile network (PLMN) assigned ID and comparing the user equipment's TAC with a list of TACs enabled to operate according to a respective user equipment manufacturer ID. In circumstances where the user equipment's TAC appears on the list and the user equipment's user equipment radio capability ID is the public land mobile network (PLMN) assigned ID, the method further includes constructing a registration accept message, wherein the registration accept message includes instructions for the user equipment to: 1) operate based on the user equipment manufacturer ID, 2) delete PLMN assigned IDs the user equipment stores for respective PLMNs and 3) trigger the user equipment to register with the user equipment manufacturer ID associated with a current user equipment radio configuration. In circumstances where the user equipment's TAC does not appear on the list and the user equipment's user equipment radio capability ID is the user equipment manufacturer ID, the method further includes constructing the registration accept message, wherein the registration accept message includes instructions for the user equipment to operate based on the PLMN assigned ID. The method then includes transmitting the registration accept message to the user equipment.

In some implementations the method further includes assigning the PLMN assigned ID and constructing the registration accept message, wherein the registration accept message includes instructions for the user equipment to operate based on the PLMN assigned ID in circumstances where the user equipment's TAC does not appear on the list and the user equipment's user equipment radio capability ID is not determined. In circumstances where the user equipment's TAC appears on the list and the user equipment's user equipment radio capability ID is not determined, the method includes constructing the registration accept message, wherein the registration accept message includes instructions for the user equipment to operate based on the user equipment manufacturer ID.

In some implementations the method further includes storing the assigned PLMN assigned ID as the user equipment radio capability ID along with their associated TACs and transmitting a notification of a switch from the PLMN assigned ID to the user equipment manufacturer ID and vice-versa for a specific TAC. Thereafter, when an indication is received to switch to the user equipment manufacturer ID for the specific TAC, the method further includes removing the association of the PLMN assigned ID to the specific TAC. In another example implementation, the method includes removing the dissociated PLMN assigned ID from storage when the PLMN assigned ID becomes disassociated to the specific TAC. The method then includes transmitting a message instruction to a user equipment capabilities management function (UCMF) to store the assigned PLMN assigned ID and associate the assigned PLMN assigned ID to the specific TAC.

In some embodiments, the method further includes determining whether to commence assignment of the user equipment manufacturer ID or the PLMN assigned ID by obtaining the TAC from the IMEI or the PEI, identifying a manufacturer identifier of the user equipment based on the TAC, and verifying the manufacturer identifier with a predetermined list of stored manufacturer identifiers.

In another example embodiment, an apparatus is provided that includes means for receiving, from a user equipment, a registration request message comprising information related to location registration to an access and mobility management function (AMF) or a mobility management entity (MME) through a radio access network (RAN), means for obtaining an international mobile equipment identity (IMEI) or permanent equipment identifier (PEI) of the user equipment and extracting a type allocation code (TAC) from the IMEI or the PEI and means for obtaining a user equipment radio capability identification (ID) associated with the user equipment. The user equipment radio capability ID represents the user equipment's radio access capabilities information. The apparatus further includes means for determining whether the user equipment radio capability ID is a user equipment manufacturer ID or a public land mobile network (PLMN) assigned ID and means for comparing the user equipment's TAC with a list of TACs enabled to operate according to a respective user equipment manufacturer ID. In circumstances where the user equipment's TAC appears on the list and the user equipment's user equipment radio capability ID is the public land mobile network (PLMN) assigned ID, the apparatus further includes means for constructing a registration accept message, wherein the registration accept message includes instructions for the user equipment to: 1) operate based on the user equipment manufacturer ID, 2) delete PLMN assigned IDs the user equipment stores for respective PLMNs and 3) trigger the user equipment to register with the user equipment manufacturer ID associated with a current user equipment radio configuration. In circumstances where the user equipment's TAC does not appear on the list and the user equipment's user equipment radio capability ID is the user equipment manufacturer ID, the apparatus further includes means for constructing the registration accept message, wherein the registration accept message includes instructions for the user equipment to operate based on the PLMN assigned ID. The apparatus further includes means for transmitting the registration accept message to the user equipment.

In another example embodiment, an apparatus is provided that includes at least one processor and at least one memory including computer program code for one or more programs with the at least one memory and the computer program code configured to, with the at least one processor, cause the apparatus at least to receive, from a user equipment, a registration request message comprising information related to location registration to an access and mobility management function (AMF) or a mobility management entity (MME) through a radio access network (RAN), obtain an international mobile equipment identity (IMEI) or permanent equipment identifier (PEI) of the user equipment and extracting a type allocation code (TAC) from the IMEI or the PEI and obtain a user equipment radio capability identification (ID) associated with the user equipment. The user equipment radio capability ID represents the user equipment's radio access capabilities information. The computer program code is further configured to, with the at least one processor, cause the apparatus to determine whether the user equipment radio capability ID is a user equipment manufacturer ID or a public land mobile network (PLMN) assigned ID and compare the user equipment's TAC with a list of TACs enabled to operate according to a respective user equipment manufacturer ID. In circumstances where the user equipment's TAC appears on the list and the user equipment's user equipment radio capability ID is the public land mobile network (PLMN) assigned ID, the computer program code is further configured to, with the at least one processor, cause the apparatus to construct a registration accept message, wherein the registration accept message includes instructions for the user equipment to: 1) operate based on the user equipment manufacturer ID, 2) delete PLMN assigned IDs the user equipment stores for respective PLMNs and 3) trigger the user equipment to register with the user equipment manufacturer ID associated with a current user equipment radio configuration. In circumstances where the user equipment's TAC does not appear on the list and the user equipment's user equipment radio capability ID is the user equipment manufacturer ID, the computer program code is further configured to, with the at least one processor, cause the apparatus to construct the registration accept message, wherein the registration accept message includes instructions for the user equipment to operate based on the PLMN assigned ID. The computer program code is further configured to, with the at least one processor, cause the apparatus to transmit the registration accept message to the user equipment.

In another example embodiment, a computer program product is provided that includes at least one non-transitory computer-readable storage medium having computer executable program code instructions stored therein with the computer executable program code instructions comprising program code instructions configured, upon execution, to receive, from a user equipment, a registration request message comprising information related to location registration to an access and mobility management function (AMF) or a mobility management entity (MME) through a radio access network (RAN), obtain an international mobile equipment identity (IMEI) or permanent equipment identifier (PEI) of the user equipment and extracting a type allocation code (TAC) from the IMEI or the PEI and obtain a user equipment radio capability identification (ID) associated with the user equipment. The user equipment radio capability ID represents the user equipment's radio access capabilities information. The computer executable program code instructions comprising program code instructions is further configured, upon execution, to determine whether the user equipment radio capability ID is a user equipment manufacturer ID or a public land mobile network (PLMN) assigned ID and compare the user equipment's TAC with a list of TACs enabled to operate according to a respective user equipment manufacturer ID. In circumstances where the user equipment's TAC appears on the list and the user equipment's user equipment radio capability ID is the public land mobile network (PLMN) assigned ID, the computer executable program code instructions comprising program code instructions is further configured, upon execution, to construct a registration accept message, wherein the registration accept message includes instructions for the user equipment to: 1) operate based on the user equipment manufacturer ID, 2) delete PLMN assigned IDs the user equipment stores for respective PLMNs and 3) trigger the user equipment to register with the user equipment manufacturer ID associated with a current user equipment radio configuration. In circumstances where the user equipment's TAC does not appear on the list and the user equipment's user equipment radio capability ID is the user equipment manufacturer ID, the computer executable program code instructions comprising program code instructions is further configured, upon execution, to construct the registration accept message, wherein the registration accept message includes instructions for the user equipment to operate based on the PLMN assigned ID. The computer executable program code instructions comprising program code instructions is further configured, upon execution, to transmit the registration accept message to the user equipment.

In yet another example embodiment, a method is provided that includes transmitting a location registration request message to an access and mobility management function (AMF) or a mobility management entity (MME) through a radio access network (RAN) and identifying a current user equipment radio configuration associated with the registration request. The method further includes receiving a registration accept message comprising a user equipment radio capability identification (ID). In circumstances where the registration accept message indicates instructions to operate according to a user equipment manufacturer ID, the method further provides for deleting stored public land mobile network (PLMN) assigned IDs and re-registering using the user equipment manufacturer ID associated with the current user equipment radio configuration as the user equipment radio capability ID. In circumstances where the registration accept message indicates instructions to operate according to a PLMN assigned ID, the method further includes associating the PLMN assigned ID to the current user equipment radio configuration.

In another example embodiment, an apparatus is provide comprising means for transmitting a location registration request message to an access and mobility management function (AMF) or a mobility management entity (MME) through a radio access network (RAN) and means for identifying a current user equipment radio configuration associated with the registration request. The apparatus further provides for means for receiving a registration accept message comprising a user equipment radio capability identification (ID). In circumstances where the registration accept message indicates instructions to operate according to a user equipment manufacturer ID, the apparatus further provides means for deleting stored public land mobile network (PLMN) assigned IDs and re-registering using the user equipment manufacturer ID associated with the current user equipment radio configuration as the user equipment radio capability ID. In circumstances where the registration accept message indicates instructions to operate according to a PLMN assigned ID, the apparatus includes means for associating the PLMN assigned ID to the current user equipment radio configuration.

In another example embodiment, an apparatus is provided that includes at least one processor and at least one memory including computer program code for one or more programs with the at least one memory and the computer program code configured to, with the at least one processor, cause the apparatus at least to transmit a location registration request message to an access and mobility management function (AMF) or a mobility management entity (MME) through a radio access network (RAN), identify a current user equipment radio configuration associated with the registration request, and receive a registration accept message comprising a user equipment radio capability identification (ID). In circumstances where the registration accept message indicates instructions to operate according to a user equipment manufacturer ID, the at least one memory and the computer program code is further configured to, with the at least one processor, cause the apparatus at least to delete stored public land mobile network (PLMN) assigned IDs and re-registering using the user equipment manufacturer ID associated with the current user equipment radio configuration as the user equipment radio capability ID. In circumstances where the registration accept message indicates instructions to operate according to a PLMN assigned ID, the at least one memory and the computer program code is further configured to, with the at least one processor, cause the apparatus at least to associate the PLMN assigned ID to the current user equipment radio configuration.

In yet another example embodiment, a computer program product is provided that includes at least one non-transitory computer-readable storage medium having computer executable program code instructions stored therein with the computer executable program code instructions comprising program code instructions configured, upon execution, to transmit a location registration request message to an access and mobility management function (AMF) or a mobility management entity (MME) through a radio access network (RAN), identify a current user equipment radio configuration associated with the registration request, and receive a registration accept message comprising a user equipment radio capability identification (ID). The computer executable program code instructions comprising program code instructions is further configured, upon execution, to delete stored public land mobile network (PLMN) assigned IDs and re-registering using the user equipment manufacturer ID associated with the current user equipment radio configuration as the user equipment radio capability ID in circumstances where the registration accept message indicates instructions to operate according to a user equipment manufacturer ID. In circumstances where the registration accept message indicates instructions to operate according to a PLMN assigned ID, the computer executable program code instructions comprising program code instructions is further configured, upon execution, to associate the PLMN assigned ID to the current user equipment radio configuration.

BRIEF DESCRIPTION OF THE DRAWINGS

Figure 1:
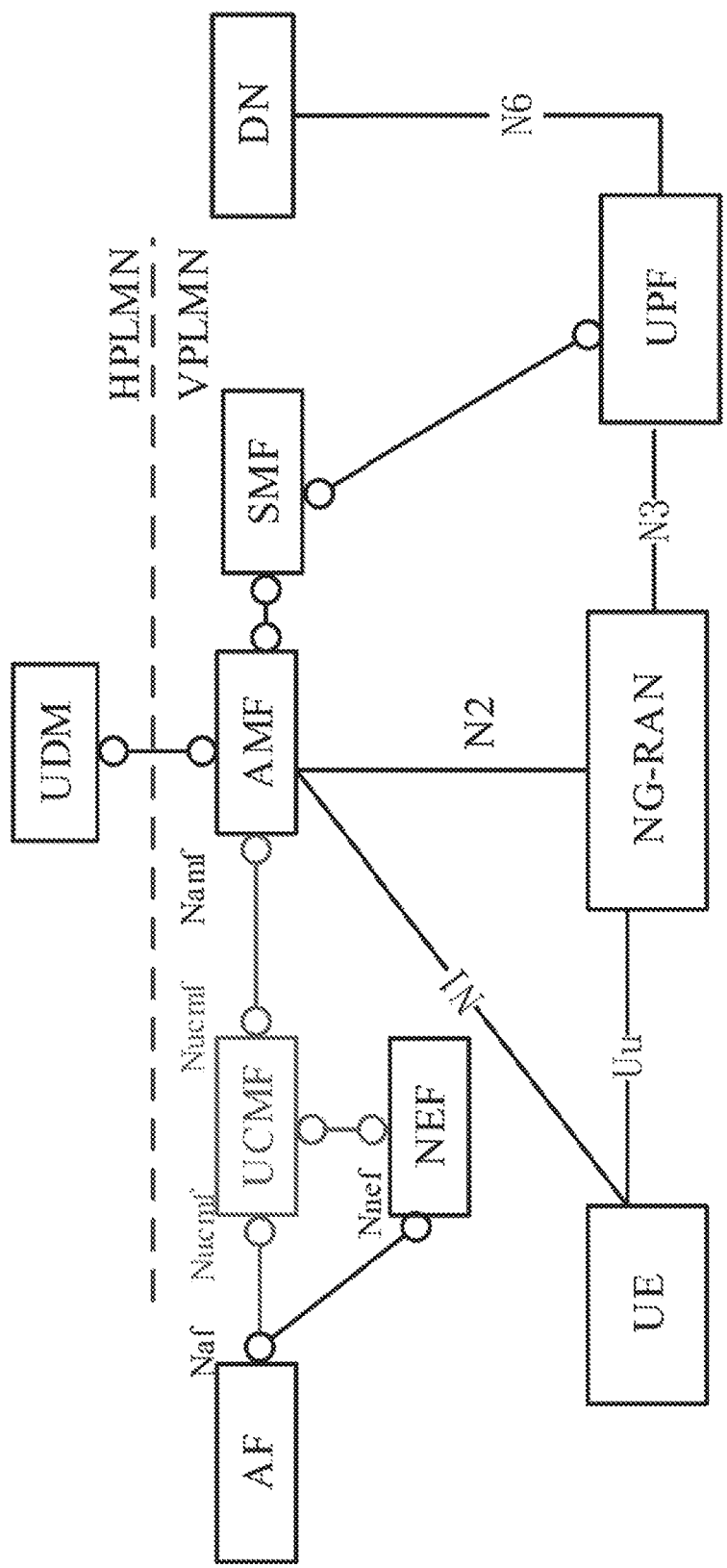
Figure 2:
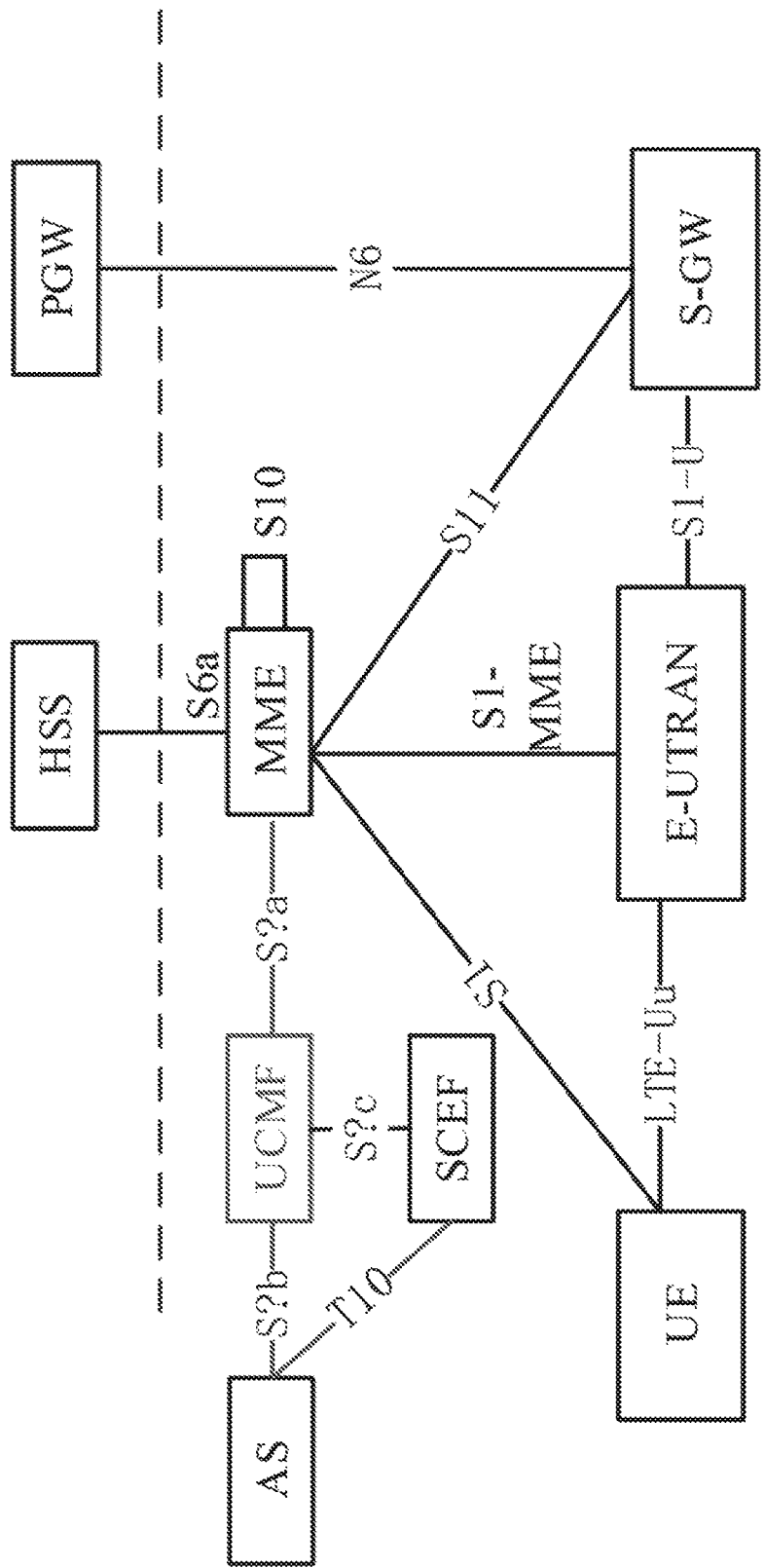
Figure 3:
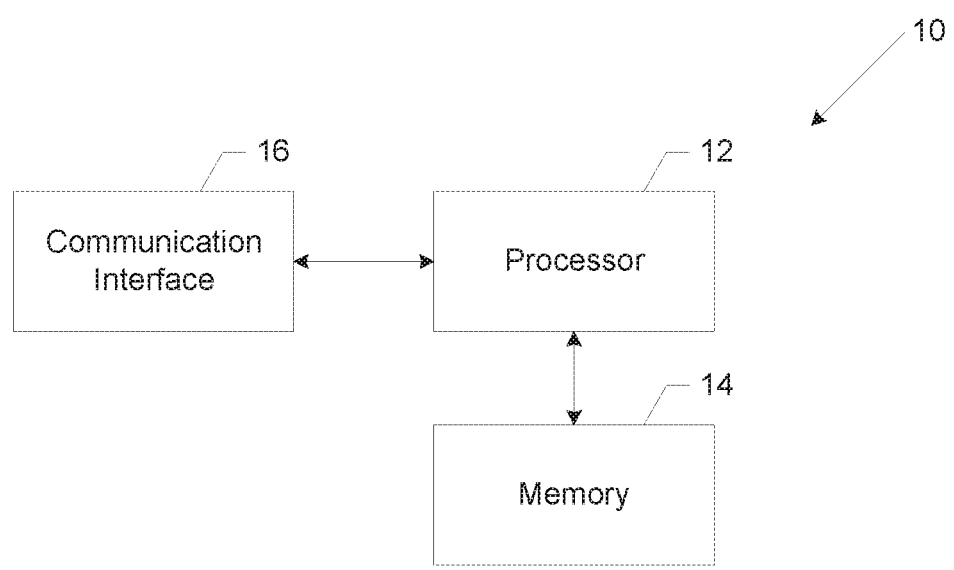
Figure 4:
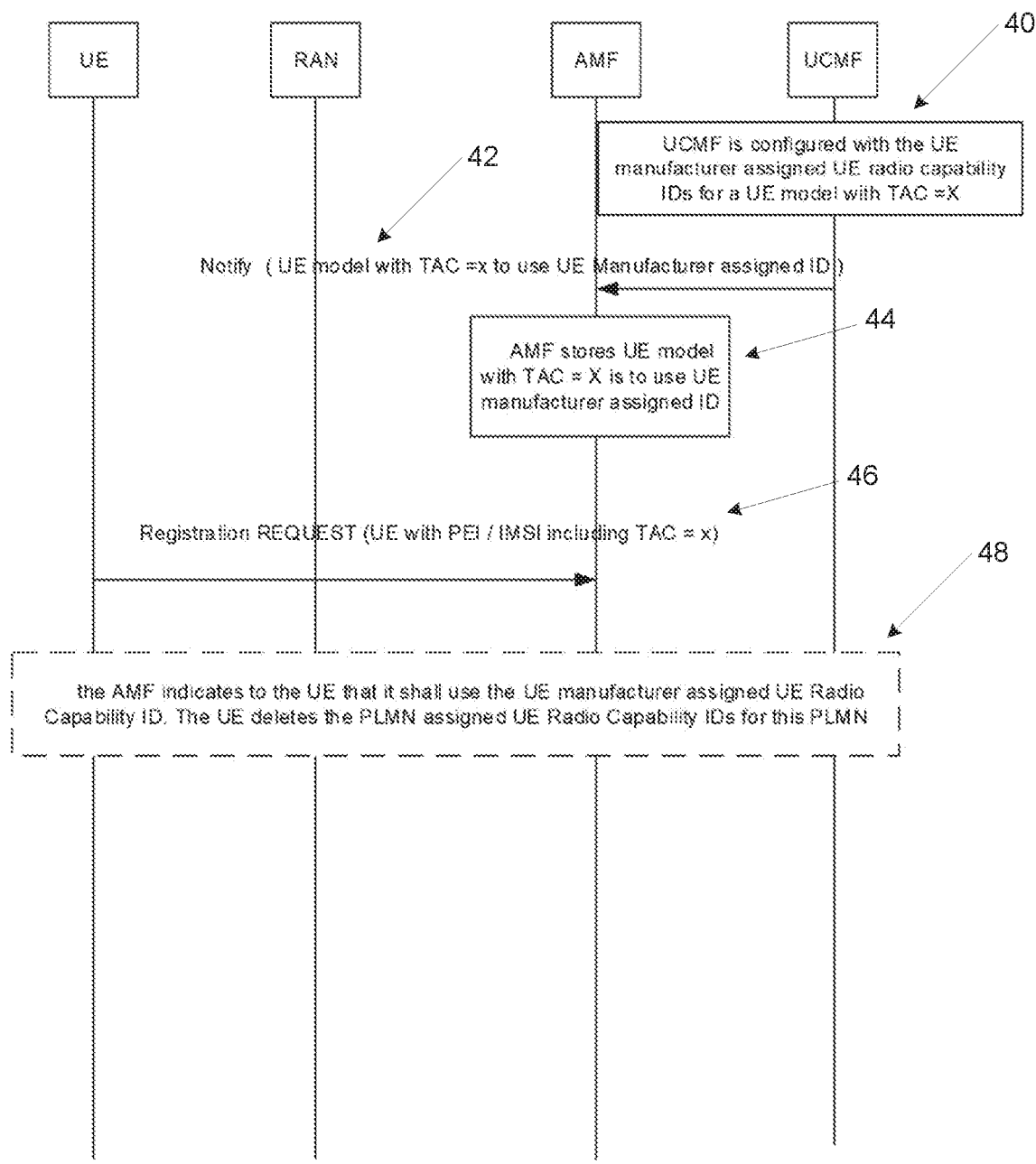
Figure 5A:
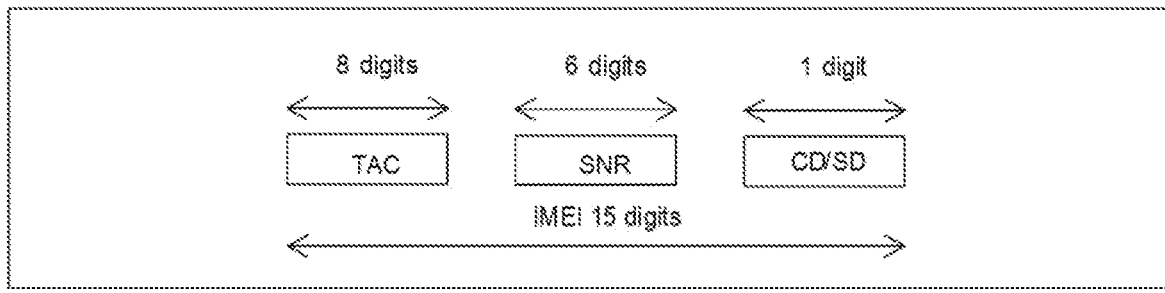
Figure 5B:
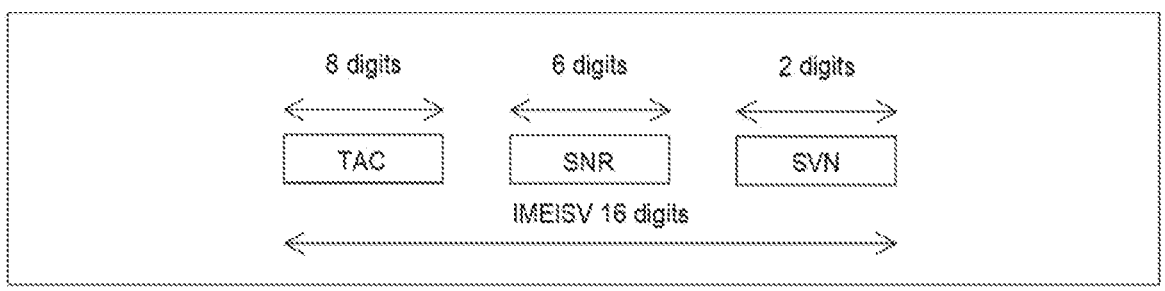
Figure 6A:
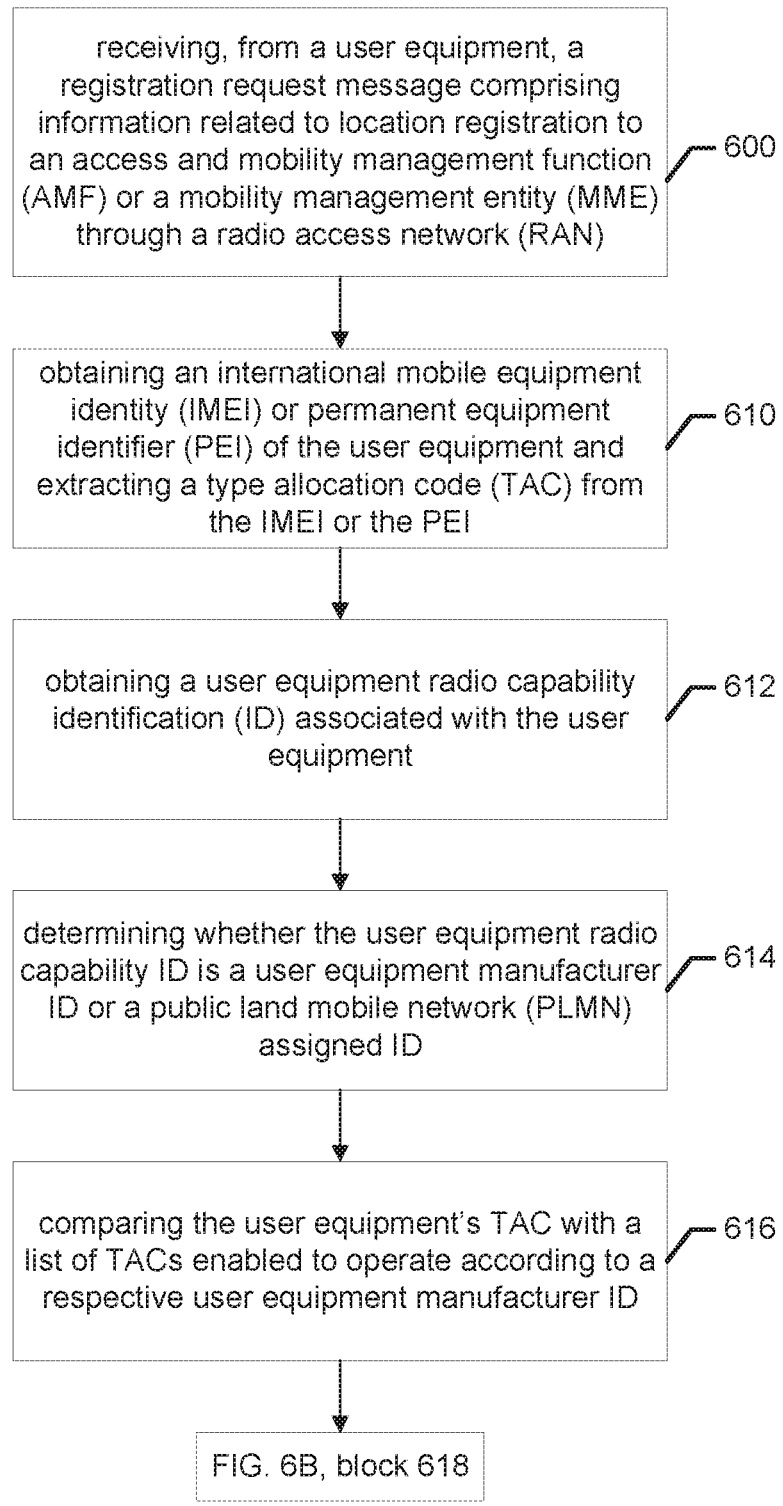
Figure 6B:
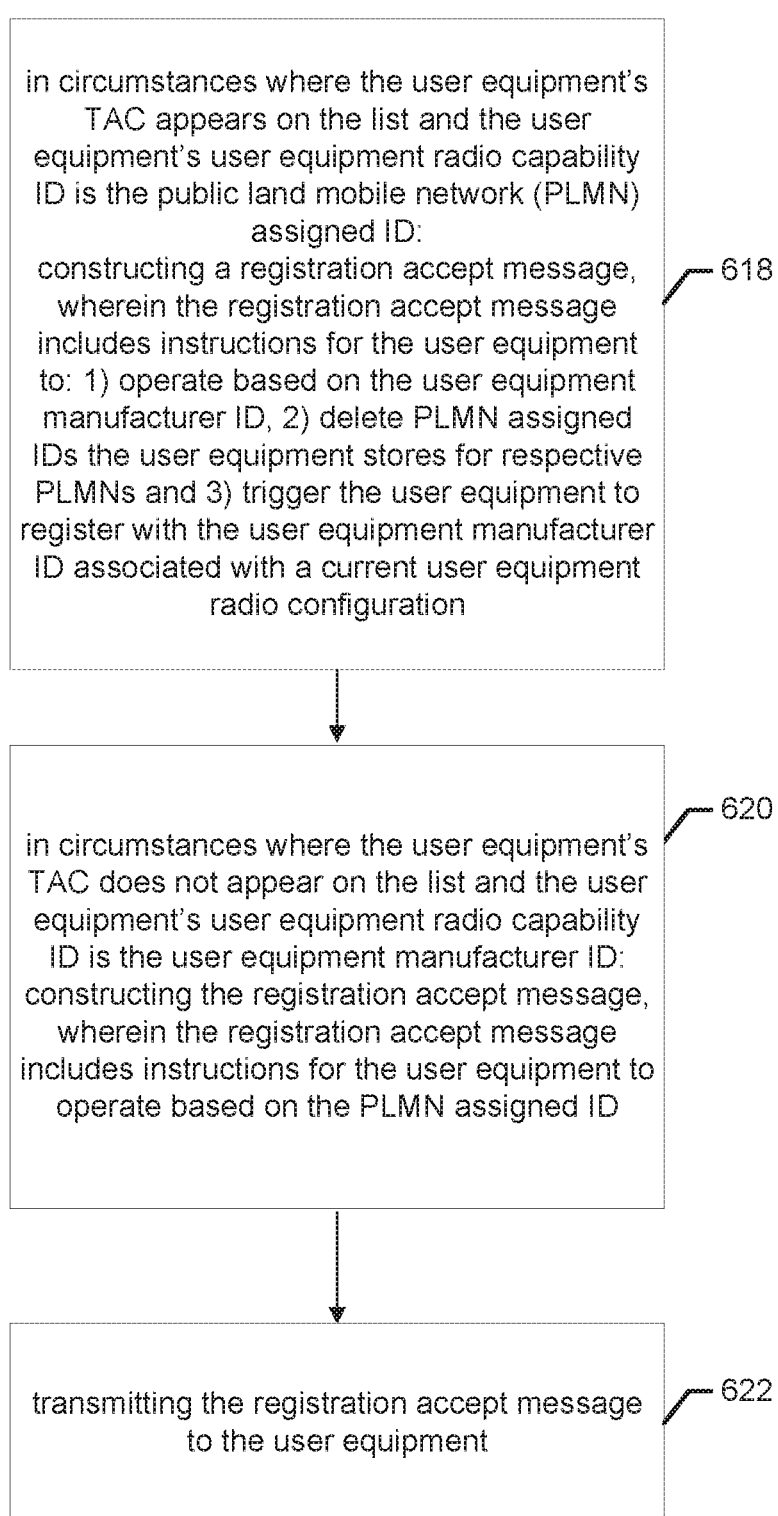
Figure 7:
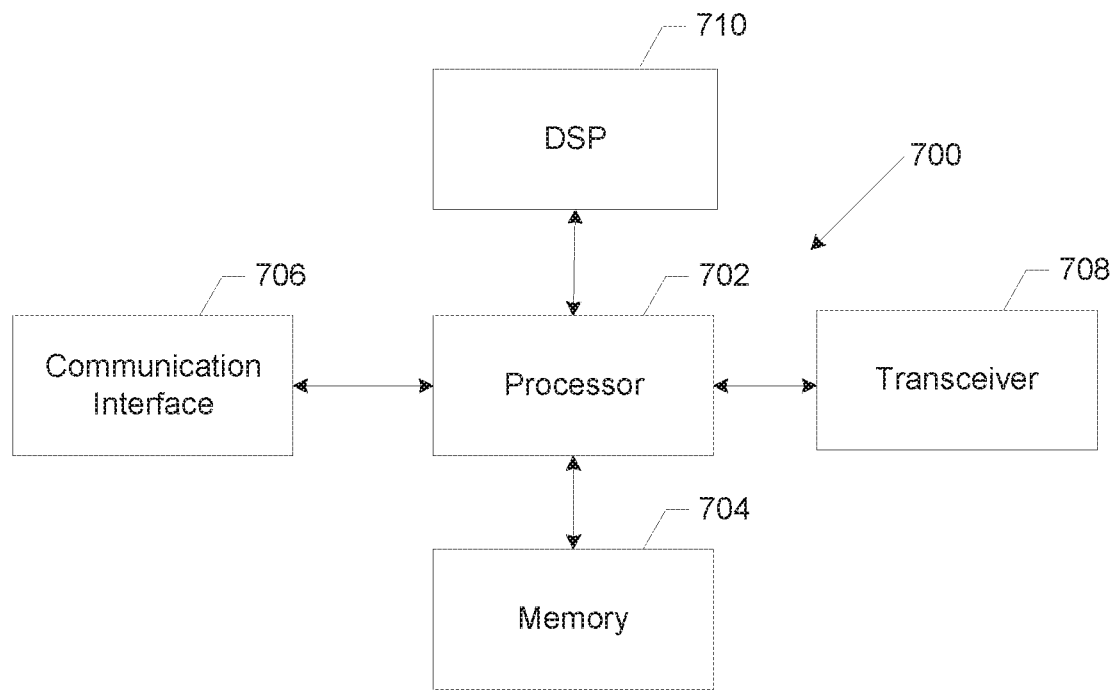
Figure 8:
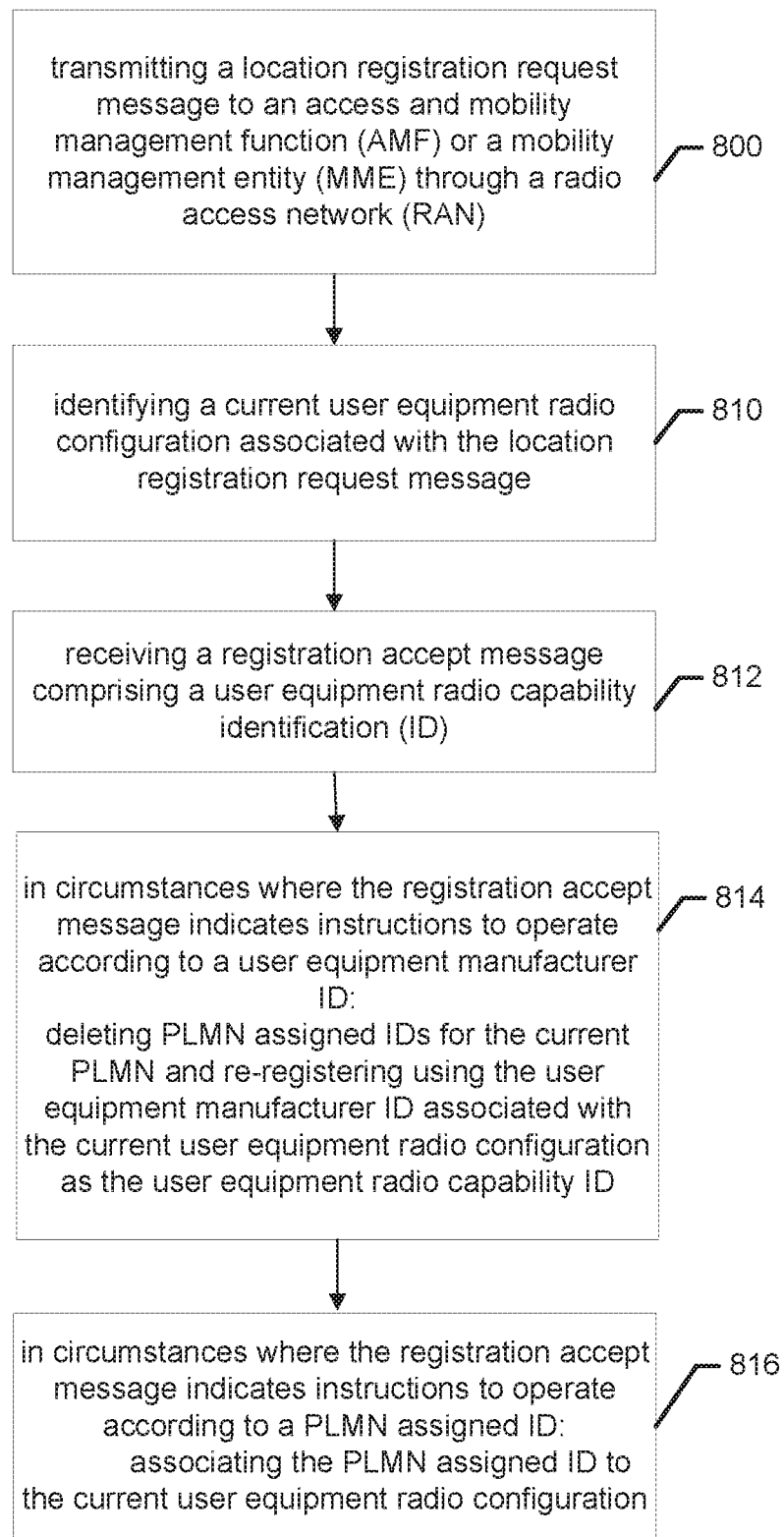

Having thus described certain example embodiments of the invention in general terms, reference will now be made to the accompanying drawings, which are not necessarily drawn to scale, and wherein:

FIG. 1 illustrates a system architecture in accordance with an example embodiment of the present disclosure;

FIG. 2 illustrates a system architecture in accordance with an example embodiment of the present disclosure;

FIG. 3 is a block diagram of a core network apparatus configured in accordance with an example embodiment of the present disclosure;

FIG. 4 illustrates example transmissions between a user equipment and a radio capabilities signalling optimization (RACS) network in accordance with an example embodiment of the present disclosure;

FIGS. 5A and 5B illustrate an international mobile station equipment identity and software version number in accordance with an example embodiment of the present disclosure;

FIGS. 6A and 6B are flowcharts illustrating methods for intelligently switching from a public land mobile network (PLMN) assigned identification (ID) to an UE manufacturer assigned ID as described herein;

FIG. 7 is a block diagram of a user equipment configured in accordance with an example embodiment of the present disclosure; and FIG. 8 is a flowchart illustrating methods for intelligently switching operations from a public land mobile network (PLMN) assigned identification (ID) to an UE manufacturer assigned ID as described herein.

DETAILED DESCRIPTION

Some embodiments of the present invention will now be described more fully hereinafter with reference to the accompanying drawings, in which some, but not all, embodiments of the invention are shown. Indeed, various embodiments of the invention may be embodied in many different forms and should not be construed as limited to the embodiments set forth herein; rather, these embodiments are provided so that this disclosure will satisfy applicable legal requirements. Like reference numerals refer to like elements throughout. As used herein, the terms "data," "content," "information," and similar terms may be used interchangeably to refer to data capable of being transmitted, received and/or stored in accordance with embodiments of the present invention. Thus, use of any such terms should not be taken to limit the spirit and scope of embodiments of the present invention.

Additionally, as used herein, the term 'circuitry' refers to (a) hardware-only circuit implementations (e.g., implementations in analog circuitry and/or digital circuitry); (b) combinations of circuits and computer program product(s) comprising software and/or firmware instructions stored on one or more computer readable memories that work together to cause an apparatus to perform one or more functions described herein; and (c) circuits, such as, for example, a microprocessor(s) or a portion of a microprocessor(s), that require software or firmware for operation even if the software or firmware is not physically present. This definition of 'circuitry' applies to all uses of this term herein, including in any claims. As a further example, as used herein, the term 'circuitry' also includes an implementation comprising one or more processors and/or portion(s) thereof and accompanying software and/or firmware. As defined herein, a "computer-readable storage medium," which refers to a physical storage medium (e.g., volatile or non-volatile memory device), may be differentiated from a "computer-readable transmission medium," which refers to an electromagnetic signal.

A method, apparatus and computer program product are provided in accordance with an example embodiment to provide efficient approach for signalling UE radio access capability information over the radio interface and other network interfaces as described herein.

FIG. 1 depicts a 5G system architecture having radio capabilities signalling optimization (RACS) in accordance with an example embodiment of the present disclosure. In general, under RACS, the network will support an efficient approach to signal UE radio access capability information over the radio interface and other network interfaces. RACS works by assigning an identifier to represent a set of UE radio capabilities. This identifier is called UE radio capability identification (ID). A UE radio capability ID can be either UE manufacturer assigned or PLMN assigned. The UE radio capability ID is an alternative to the signalling of the radio capabilities container over the radio interface, within NG-RAN, from NG-RAN to E-UTRAN, from AMF to NG-RAN and between CN nodes supporting RACS.

As shown in FIG. 1 and in FIG. 2, the 5G system architecture may consist of the following network functions (NF): Authentication Server Function (AUSF), Access and Mobility Management Function (AMF), Data Network (DN), e.g. operator services, Internet access or 3rd party services, Unstructured Data Storage Function (UDSF), Network Exposure Function (NEF), Network Repository Function (NRF), Network Slice Selection Function (NSSF), Policy Control Function (PCF), Session Management Function (SMF), Unified Data Management (UDM), Unified Data Repository (UDR), User Plane Function (UPF), UE radio Capability Management Function (UCMF), Application Function (AF), User Equipment (UE), Next Generation- Radio Access Network (NG-RAN), 5G-Equipment Identity Register (5G-EIR), Network Data Analytics Function (NWDAF), and Charging Function (CHF). The 5G system architecture may further comprise the following network entities: Service Communication Proxy (SCP) and Security Edge Protection Proxy (SEPP).

FIG. 2 depicts the UE MME Core Network Capability that is split into the 51 UE MME network capability (mostly for E-UTRAN access related core network parameters) and the Core Network Capability (mostly to include other UE capabilities related to 5GCN or interworking with EPS) and contains non radio-related capabilities, e.g. the NAS security algorithms (not shown) etc. The 51 UE MME network capability is transferred between all CN nodes at AMF to AMF, AMF to MME, MME to MME, and MME to AMF changes. The 5GMM capability is transferred only at AMF to AMF changes.

In order to ensure that the UE identity stored in the USIM (Universal Subscriber Identity Module) is authenticated and registered with the System, the UE RM and network capabilities and the UE location information stored in the AMF is up to date the UE s perform initial Registration and mobility registration update procedure within the NAS message. The UE may include the UE radio capability ID in such messages.

Additionally or alternatively, if the UE's UE RM Core Network Capability information changes (in either CM-CONNECTED or in CM-IDLE state), the UE shall perform a Mobility Registration Update procedure when it next returns to NG-RAN coverage. The UE may include the UE radio capability ID in this message.

FIGS. 1 and 2 further include the following service-based interfaces: Namf: Service-based interface exhibited by AMF; Nsmf: Service-based interface exhibited by SMF; Nnef: Service-based interface exhibited by NEF; Npcf: Service-based interface exhibited by PCF; Nudm: Service-based interface exhibited by UDM; Naf: Service-based interface exhibited by AF; Nnrf: Service-based interface exhibited by NRF; Nnssf: Service-based interface exhibited by NSSF; Nausf: Service-based interface exhibited by AUSF; Nudr: Service-based interface exhibited by UDR; Nudsf: Service-based interface exhibited by UDSF; N5g-eir: Service-based interface exhibited by 5G-EIR; Nnwdaf: Service-based interface exhibited by NWDAF; Nchf: Service-based interface exhibited by CHF; and Nucmf: Service-based interface exhibited by UCMF.

Moreover, although the foregoing descriptions and the associated drawings describe certain example embodiments in the context of an improved 5G communication system, it should be appreciated that other communication systems may be provided by alternative embodiments without departing from the scope of the appended claims. Although 5G technology and 5G systems are employed herein, they are used in a illustrative and descriptive sense only and not for purposes of limitation.

As described above, the UE radio capability information contains information on radio capabilities that the UE supports (e.g. power class, frequency bands, etc). Consequently, this information can be sufficiently large that it is undesirable to send it across the radio interface at every transition of UE connection management (CM) state in the AMF from CM-IDLE to CM-CONNECTED. In an example embodiment, in order to avoid this radio overhead, the AMF shall store the UE Capability information during the CM-IDLE state for the UE and RM-REGISTERED state for the UE and the AMF shall, when available, send its most up to date UE Radio Capability information to the RAN in the N2 REQUEST message sent on the N2 interface as shown in FIG. 1. The AMF then deletes the UE radio capability when the UE RM state in the AMF transitions to RM-DEREGISTERED. In an example embodiment, the UE Radio Capability is maintained in the core network, even during AMF reselection.

In an example embodiment, the number of PLMN assigned IDs that the UE stores in non-volatile memory is left up to UE implementation. However, to minimise the load from radio signalling on the UE interface and to provide smoother inter-PLMN mobility (e.g. at land borders) the UE shall be able to store at least the latest 16 PLMN-assigned IDs, for example, (along with the PLMN that is assigned to them). In some embodiments, this number is independent of the UE Radio Capability ID(s) the UE may store.

Additionally or alternatively, the UE may be configured to change, e.g. upon change in its usage settings, the set of UE Radio Capabilities in time and signal the associated UE Radio Capability ID, if available. The UE may then be configured to store the mapping between the UE Radio Capability ID and the corresponding UE Radio Capability information for every UE Radio Capability ID. Accordingly, the NG-RAN may apply RRC filtering of UE radio capabilities when it retrieves the UE Radio Capabilities information from the UE.

In circumstances when the UE's NG-RAN UE radio capability information changes while in CM-IDLE state, the UE shall perform the registration procedure with the registration type set to mobility registration update indicating "UE Radio Capability Update". When the AMF receives mobility registration update request with "UE Radio Capability Update", it shall delete any UE radio capability information that it has stored for the UE.

In an example embodiment when the trigger to change the UE's NG-RAN UE radio capability information happens when the UE is in CM-CONNECTED state, the UE shall first enter CM-IDLE state and then perform the registration procedure with the registration type set to mobility registration update indicating "UE Radio Capability Update". The RAN stores the UE radio capability information, received in the N2 message or obtained from the UE, for the duration of the UE staying in radio resource control (RRC) connected or RRC Inactive state.

The UCMF (UE radio Capability Management Function) stores all UE Radio Capability ID mappings in a PLMN and is responsible for assigning every PLMN-assigned UE Radio Capability ID in this PLMN.

In an example embodiment, in order to be able to interpret the UE Radio Capability ID a Network Function or node may store a local copy of the mapping between the UE Radio Capability ID and its corresponding UE Radio Access Capabilities information e.g. a dictionary entry. When no mapping is available between a UE Radio Capability ID and the corresponding UE Radio Capability information in a Network Function or node, this Network Function or node shall be able to retrieve it and store it.

In an example embodiment, in an instance when the NG-RAN needs to retrieve the mapping of a UE Radio Capability ID to the corresponding UE Radio Capability information, it queries the AMF using N2 signalling. For example, the AMF retrieves the UE Radio Capability Information it provides it to UCMF in order to obtain a mapping of a UE Radio Capability ID to the corresponding UE Radio Capabilities information.

In an example embodiment, a UE that supports RACS stores an applicable UE Radio Capability ID for the current UE Radio Configuration in the PLMN, it shall signal the UE Radio Capability ID in the Initial Registration procedure. If both PLMN-assigned for the current PLMN and UE manufacturer-assigned UE Radio Capability IDs are stored in the UE and applicable in the PLMN, the UE shall signal the PLMN assigned UE Radio Capability ID in the Registration Request message.

In some examples when a PLMN decides to switch to operate based on manufacturer-assigned UE Radio Capability ID for a particular TAC identifying a UE model, the UCMF indicates to the AMFs it is in contact with that the specific TAC operates in UE manufacturer-assigned UE Radio Capability ID mode such that the AMF indicates to the NG-RAN nodes it is in contact with via a N2 message that the specific TAC operates in UE manufacturer-assigned UE Radio Capability ID mode.

In some networks, the AMF indicates to UEs that register with the specific TAC value in the PEI and providing a PLMN-assigned UE Radio Capability ID that the PLMN requires it to operate based on UE manufacturer-assigned UE Radio Capability IDs. A UE that receives such indication in the Registration Accept message deletes any PLMN assigned IDs it stores for the PLMN so that this UE shall use the UE manufacturer-assigned UE Radio Capability IDs until the PLMN provides it with any PLMN-assigned Radio Capability ID. In addition, the UE proceeds to Register with the UE manufacturer assigned UE Radio Capability ID that is applicable to the current UE Radio configuration so that the system is aware of its current UE Radio Capability ID and related UE radio capabilities.

In an example embodiment, the UE Radio Capability ID may be a short pointer that is used to uniquely identify a set of UE Radio Capabilities. The UE Radio Capability ID is assigned either by the serving PLMN or by the UE manufacturer. The manufacturer-assigned UE Radio Capability ID may be assigned by the UE manufacturer in which case it is accompanied with the UE manufacturer information. In this case, the UE Radio Capability ID uniquely identifies a set of UE Radio Capabilities for this manufacturer, and together with this UE manufacturer information uniquely identify this set of UE Radio Capabilities in any PLMN.

In the PLMN-assigned ID, when a manufacturer-assigned UE Radio Capability ID is not used by the UE or the serving network, or it is not recognized/stored by the serving PLMN UCMF, the UCMF may allocate UE Radio Capability IDs for the UE corresponding to different sets of UE Radio capabilities the PLMN may receive from the UE at different times. In this case, the UE Radio Capability IDs the UE receives are applicable to the serving PLMN and uniquely identify the corresponding sets of UE Radio Capabilities in this PLMN.

The type of UE Radio Capability ID (Manufacturer-assigned or PLMN-assigned) is distinguished when a UE Radio Capability ID is signalled. The NG-RAN and the AMF caching (or storing in the UE contexts) the PLMN-assigned UE Radio Capability IDs keeps an association to the TAC of the UE model that they are related to. When a PLMN switches to UE manufacturer-assigned UE Radio Capability ID for a particular UE model TAC, all PLMN-assigned UE Radio Capability ID related to this TAC can be removed from the cache with priority, irrespective of the caching policies.

In yet another example embodiment, the AMF keeps a list of TACs that are enabled to use UE manufacturer IDs (or it can query the UCMF to detect whether there is a database of UE manufacturer assigned IDs for the TAC of the UE). This can be progressively populated by the UCMF when the UCMF receives the dictionary for a TAC. If a UE registers with the AMF with a PLMN assigned type of UE capability ID and the TAC of the UE is in this list, the AMF shall indicate to the UE in Registration accept message that the PLMN requires sending the UE manufacturer assigned UE Capability IDs and not the PLMN assigned ID. This will be the behaviour the UE stores for this PLMN even when the UE is deregistered. To this effect, the UE erases all the PLMN assigned IDs for the PLMN when it receives indication the PLMN supports UE manufacturer assigned. The UE re-registers immediately with a UE manufacturer assigned UE Capability ID.

In instances when the AMF or the MME receives an indication of the switch from a PLMN assigned ID to a UE manufacturer assigned ID for a TAC value, the AMF or MME may be configured to check all the contexts of the UEs they store and if the IMEI/PEI contains such TAC value, the UEs get updated by the network on whether to use UE manufacturer assigned IDs or PLMN assigned IDs by means of a UE configuration update message (by AMF in 5GS) or a globally unique temporary ID (GUTI) reallocation command message (by MME in EPS).

In an example embodiment, an attach procedure can occur when powering-on the UE or when the UE enters a network. The UE registers via the registration request message with the network to receive services that require registration. In an attach procedure, the UE transmits an "attach request" or "tracking area update request" to the network and the network affirms the attach request with an attach accept message such as, for example, an "attach accept" or "tracking area update accept." In various embodiments, the "attach accept" or "tracking area update accept" message can be modified to include instructions whether the UE shall use a UE manufacturer assigned ID or PLMN assigned ID.

In an instance when the UE registers with a UE manufacturer assigned UE Capability ID but the PLMN does not store the UE manufacturer assigned UE Capability IDs and their mapping to UE Radio capabilities for this TAC, then the AMF indicates in registration accept to use PLMN assigned ID. A PLMN assigned ID is then provided to the UE for the UE current radio capabilities. This ID could also be directly provided in the registration accept message (so no indication is needed), or separately in a UE configuration update after the UE registration completes. This information shall be stored and clears any previous information that the UE shall use UE manufacturer assigned UE Capability IDs (implicitly anyhow a UE that has a PLMN assigned ID shall use it). This enables to switch from UE manufacturer assigned ID to PLMN assigned ID method or it allows to use PLMN assigned ID in a PLMN where some UEs can operate in PLMN assigned mode even if they have a UE manufacturer ID assigned by the manufacturer (e.g. the PLMN operator has not yet got the dictionary for that UE model) but some UE models for which the UCMF stores the dictionary can use UE-manufacturer assigned mode.

In another example embodiment when the UE registers without indicating any UE capability ID, but the UE indicates it supports the RACS feature, then the PLMN assigned ID is provided if the UE's TAC is not in the list of UE model that use UE-manufacturer-assigned UE capability ID. Otherwise an indication is provided to use UE manufacturer-assigned UE capability ID.

The RAN and CN store the PLMN assigned IDs with the related TAC, so the RAN and CN can receive indication these are stale when the UE manufacturer assigned UE Capability IDs become supported for a UE TAC in a PLMN. The TAC that switches to UE manufacturer assigned UE Capability IDs is indicated to the RAN via non-UE associated signalling by the AMF. The UCMF allows AMFs to subscribe to updates of what TAC use UE manufacturer assigned UE Capability IDs as, e.g., the UCMF is populated with the related UE manufacturer assigned UE Capability IDs and the UCMF is therefore ready to resolve these IDs. Likewise if for a certain TAC, for any reason, the stops using the UE manufacturer assigned ID the UCMF may notify the AMF In an example embodiment, each PLMN-assigned ID should be associated in the RAN and CN caches to the TACs it is associated with. The TAC of the UE needs all the time to be transferred and passed in signalling interfaces between network nodes when the related PLMN-assigned UE capability ID is sent. When a PLMN assigned UE capability ID that is cached in the RAN or AMF has no association with any TAC because all of the IMEIs they relate to have transitioned to UE manufacturer assigned UE capability ID, then it is removed from the cache.

Turning now to FIG. 3, in order to embody the RACS including a UE capability management function (UCMF), a RAN and an access and mobility management function (AMF), an apparatus 10 is provided and as shown, for example, in FIG. 3. The apparatus may be embodied by any of a variety of different components such as different nodes of a 5G RACS-capable network architecture instance.

As shown in FIG. 3, the apparatus of an example embodiment includes, is associated with or is otherwise in communication with a processor 12, an associated memory 14 and a communication interface 16.

The processor 12 (and/or co-processors or any other circuitry assisting or otherwise associated with the processor) may be in communication with the memory device 14 via a bus for passing information among components of the apparatus 10. The memory device may be non-transitory and may include, for example, one or more volatile and/or non-volatile memories. In other words, for example, the memory device may be an electronic storage device (e.g., a computer readable storage medium) comprising gates configured to store data (e.g., bits) that may be retrievable by a machine (e.g., a computing device like the processor). The memory device may be configured to store information, data, content, applications, instructions, or the like for enabling the apparatus to carry out various functions in accordance with an example embodiment of the present disclosure. For example, the memory device could be configured to buffer input data for processing by the processor. Additionally or alternatively, the memory device could be configured to store instructions for execution by the processor.

The apparatus 10 may, in some embodiments, be embodied in various computing devices as described above. However, in some embodiments, the apparatus may be embodied as a chip or chip set. In other words, the apparatus may comprise one or more physical packages (e.g., chips) including materials, components and/or wires on a structural assembly (e.g., a baseboard). The structural assembly may provide physical strength, conservation of size, and/or limitation of electrical interaction for component circuitry included thereon. The apparatus may therefore, in some cases, be configured to implement an embodiment of the present disclosure on a single chip or as a single "system on a chip." As such, in some cases, a chip or chipset may constitute means for performing one or more operations for providing the functionalities described herein.

The processor 12 may be embodied in a number of different ways. For example, the processor may be embodied as one or more of various hardware processing means such as a coprocessor, a microprocessor, a controller, a digital signal processor (DSP), a processing element with or without an accompanying DSP, or various other circuitry including integrated circuits such as, for example, an ASIC (application specific integrated circuit), an FPGA (field programmable gate array), a microcontroller unit (MCU), a hardware accelerator, a special-purpose computer chip, or the like. As such, in some embodiments, the processor may include one or more processing cores configured to perform independently. A multi-core processor may enable multiprocessing within a single physical package. Additionally or alternatively, the processor may include one or more processors configured in tandem via the bus to enable independent execution of instructions, pipelining and/or multithreading.

In an example embodiment, the processor 12 may be configured to execute instructions stored in the memory device 14 or otherwise accessible to the processor. Alternatively or additionally, the processor may be configured to execute hard coded functionality. As such, whether configured by hardware or software methods, or by a combination thereof, the processor may represent an entity (e.g., physically embodied in circuitry) capable of performing operations according to an embodiment of the present disclosure while configured accordingly. Thus, for example, when the processor is embodied as an ASIC, FPGA or the like, the processor may be specifically configured hardware for conducting the operations described herein. Alternatively, as another example, when the processor is embodied as an executor of instructions, the instructions may specifically configure the processor to perform the algorithms and/or operations described herein when the instructions are executed. However, in some cases, the processor may be a processor of a specific device (e.g., an image processing system) configured to employ an embodiment of the present disclosure by further configuration of the processor by instructions for performing the algorithms and/or operations described herein. The processor may include, among other things, a clock, an arithmetic logic unit (ALU) and logic gates configured to support operation of the processor.

The communication interface 16 may be any means such as a device or circuitry embodied in either hardware or a combination of hardware and software that is configured to receive and/or transmit data from/to a network. In this regard, the communication interface may include, for example, an antenna (or multiple antennas) and supporting hardware and/or software for enabling communications with a wireless communication network. Additionally or alternatively, the communication interface may include the circuitry for interacting with the antenna(s) to cause transmission of signals via the antenna(s) or to handle receipt of signals received via the antenna(s). In some environments, the communication interface may alternatively or also support wired communication. As such, for example, the communication interface may include a communication modem and/or other hardware/software for supporting communication via cable, digital subscriber line (DSL), universal serial bus (USB) or other mechanisms.

Turning now to FIG. 4 illustrating operations of intelligently switching from public land mobile network (PLMN) assigned identification (ID) to UE manufacturer assigned ID. In an example embodiment, the AMFs may switch to UE manufacturer assigned ID based RACS by TAC. Accordingly, when a UCMF is populated with the UE manufacturer assigned UE Capability IDs, it shall indicate to the AMFs that a certain TAC now can use UE manufacturer assigned UE Capability IDs. For example, the UCMF provides the UE manufacturer assigned UE Capability IDs to the AMF, and these bear the TAC of the UE model that is affected such that when the UE registers the Registration Accept message provides the UE with positive indication the UE can start using the UE manufacturer IDs.

Accordingly, the RACS-capable network provides for a centralized node such as the UCMF to allocate and store the UE capability ID that represents the radio capabilities of the UE, or to store a dictionary, provided by a UE manufacturer, the UE capability ID(s) representing the UE radio capabilities of the UE model identified by the TAC.

As discussed above, the UE capability ID, if allocated by the PLMN using the UCMF, is provided to the UE and stored in the UE and is also known as PLMN-assigned UE Radio Capability ID. The IDs that are stored in the UCMF and UE as defined by the UE manufacturers and associated to the UE model TAC are also known as UE manufacturer-assigned UE radio Capability ID. The mapping of the ID to the related capabilities is also cached in the core network (CN) and RAN nodes. The UE capability ID is then sent by the UE to the network in registration messages in the 5G system so the network is aware of the UE ratio capabilities without then inquiring the full set of capabilities thus minimizing signalling size over the radio network. The UE may be identified/associated in the network in a 5GS using the TAC of the UE model.

In an example embodiment, block 40 illustrates that the UCMF is configured with the UE manufacturer assigned UE radio capability IDs for a UE model with type allocation code (TAC) indicating a manufacturer identifier. In another embodiment, the AMF keeps a list of TACs that are enabled to use UE manufacturer IDs. The list may be progressively populated by the UCMF when the UCMF receives the dictionary for a TAC from a UE manufacturer. Such a list shall be kept in non-volatile storage. In block 42, the UCMF notifies the AMF of a TAC that transitions to UE manufacturer assigned UE radio capability ID. Accordingly, the AMF stores the list comprising the UE model TACs indicating instructions for operating according to a respective user equipment manufacturer ID.

In block 46, a registration request is received from the UE and in block 48 the AMF indicates to the UE to use the UE manufacturer assigned UE radio capability ID and delete the PLMN assigned UE radio capability ID. At this time, the UE shall proceed to a further registration indicating the UE manufacturer-assigned UE radio capability ID applicable to the current UE radio configuration (e.g. corresponding to the current radio interface technologies that are enabled or disabled etc.)

FIG. 5A illustrates the structure of the IMEI wherein the IMEI code is 15-bit comprising: a type allocation code (TAC) which generally represent UE models and indicates a manufacturer identifier; a Serial Number (SNR) representing an individual serial number uniquely identifying each user equipment within the TAC and generally refers to the manufacturing sequence number; and a Check Digit (CD)/Spare Digit (SD) which is not part of the digits transmitted when the IMEI is checked. The Check Digit is intended to avoid manual transmission errors.

FIG. 5B illustrates the structure of the International Mobile station Equipment Identity and Software Version Number (IMEISV) wherein the IMEISV code is 16-bit comprising: a type allocation code (TAC) which generally represent UE models and indicates a manufacturer identifier; a Serial Number (SNR) representing an individual serial number uniquely identifying each user equipment within the TAC and generally refers to the manufacturing sequence number; and a Software Version Number (SVN) which identifies the software version number of the user equipment.

Referring now to FIGS. 6A and 6B, FIGS. 6A and 6B are flowcharts illustrating a workflow of a RACS-capable network in accordance with an example embodiment. At block 600, the RACS-capable network receives, for example by using means such as the processor 12 and the communication interface 16, a registration request message comprising information related to location registration to an access and mobility management function (AMF) or a mobility management entity (MME) through a radio access network (RAN). In an example embodiment, the registration request message indicates that the user equipment supports RACS.

Additionally or alternatively the RACS-capable network receives, for example by using means such as the processor 12 and the communication interface 16, a registration request message, an attach request message, a tracking area update request message, or the like. These messages comprising information related to location registration to the AMF or MME through the RAN.

After the RACS-capable network receives the registration request from the user equipment, the RACS-capable network, for example by using means such as the processor 12, obtains an international mobile equipment identity (IMEI) or permanent equipment identifier (PEI) of the user equipment and extracting a type allocation code (TAC) from the IMEI or the PEI as shown in block 610. In the IMEI or PEI the RACS-capable network identifies the TAC of the UE.

The registration message, for a RACS capable UE (e.g. a UE indicating RACS support) include, if available in the UE for the current radio configuration, a user equipment radio capability identification (ID) associated with the user equipment current radio configuration. The user equipment radio capability ID represents the user equipment's radio access capabilities information. As shown in block 612, the RACS-capable network, for example by using means such as the processor 12, obtains a user equipment radio capability identification (ID) associated with the user equipment. In an example embodiment, the AMF may receive the user equipment radio capability ID from the UE in the registration request process.

The RACS-capable network then determines whether the user equipment radio capability ID is a user equipment manufacturer ID or a public land mobile network (PLMN) assigned ID, for example by using means such as the processor 12, at block 614.

The RACS-capable network then by using means such as the processor 12, compares the user equipment's TAC with a list of TACs enabled to operate according to a respective user equipment manufacturer ID at block 616.

As shown in block 618 in FIG. 6B, in circumstances where the user equipment's TAC appears on the list and the user equipment's user equipment radio capability ID is the public land mobile network (PLMN) assigned ID, the RACS-capable network, for example by using means such as the processor 12, constructs a registration accept message, wherein the registration accept message includes instructions for the user equipment to: 1) operate based on the user equipment manufacturer ID, 2) delete PLMN assigned IDs the user equipment stores for respective PLMNs and 3) trigger the user equipment to register with the user equipment manufacturer ID associated with a current user equipment radio configuration.

Additionally or alternatively, the RACS-capable network, for example by using means such as the processor 12, constructs a registration accept message, an attach accept message, a tracking area update accept message, an user equipment configuration update command message, a globally unique temporary ID (GUTI) reallocation command message, or the like.

In circumstances where the user equipment's TAC does not appear on the list and the user equipment's user equipment radio capability ID is the user equipment manufacturer ID, the RACS-capable network, for example by using means such as the processor 12, constructs the registration accept message, wherein the registration accept message includes instructions for the user equipment to operate based on the PLMN assigned ID as shown in block 620.

In some embodiments, the RACS-capable network by using means such as the processor 12 may transmit the registration accept message to the user equipment as shown in block 622.

Additionally or alternatively, the RACS-capable network, for example by using means such as the processor 12, transmits the registration accept message, the attach accept message, the tracking area update accept message, the user equipment configuration update command message, or the GUTI reallocation command message.

In some circumstances where the user equipment's TAC does not appear on the list and the user equipment's user equipment radio capability ID is not determined then the RACS-capable network, for example by using means such as the processor 12, assigns the PLMN assigned ID and constructs the registration accept message to include instructions for the user equipment to operate based on the PLMN assigned ID.

In circumstances where the user equipment's TAC appears on the list and the user equipment's user equipment radio capability ID is not determined, the RACS-capable network, for example by using means such as the processor 12, constructs the registration accept message, to include instructions for the user equipment to operate based on the user equipment manufacturer ID.

In some cases, the RACS-capable network, for example by using means such as the processor 12, stores the assigned PLMN assigned ID as the user equipment radio capability ID along with their associated TACs on one or more computer readable memories. The RACS-capable network further transmits, or example by using means such as the processor 12, a notification of a switch from the PLMN assigned ID to the user equipment manufacturer ID and vice-versa for a specific TAC.

When an indication is received to switch to the user equipment manufacturer ID for the specific TAC, the RACS-capable network, for example by using means such as the processor 12, removes the specific TAC from the list of TACs enabled to operate according to the respective user equipment manufacturer ID and removes the association of the PLMN assigned ID to the specific TAC.

In the case when the PLMN assigned ID becomes disassociated to any TAC, removing the dissociated PLMN assigned ID from storage, the RACS-capable network, for example by using means such as the processor 12, transmits a message instruction to a user equipment capabilities management function (UCMF) to store the assigned PLMN assigned ID and associate the assigned PLMN assigned ID to the specific TAC.

Typically, the RACS-capable network determines, for example by using means such as the processor 12, whether to commence assignment of the user equipment manufacturer ID or the PLMN assigned ID by obtaining the TAC from the IMEI or the PEI, identifying a manufacturer identifier of the user equipment based on the TAC, and verifying the manufacturer identifier with a predetermined list of stored manufacturer identifiers.

FIG. 7 illustrates various components that may be utilized in a UE 700. The UE 700 includes a processor 702 that controls operation of the UE 700. The processor 702 may be embodied in a number of different ways. For example, the processor may be embodied as one or more of various hardware processing means such as a coprocessor, a microprocessor, a controller, a digital signal processor (DSP), a processing element with or without an accompanying DSP, or various other circuitry including integrated circuits such as, for example, an ASIC (application specific integrated circuit), an FPGA (field programmable gate array), a microcontroller unit (MCU), a hardware accelerator, a special-purpose computer chip, or the like. As such, in some embodiments, the processor may include one or more processing cores configured to perform independently. A multi-core processor may enable multiprocessing within a single physical package. Additionally or alternatively, the processor may include one or more processors configured in tandem via the bus to enable independent execution of instructions, pipelining and/or multithreading.

In an example embodiment, the processor 702 may be configured to execute instructions stored in memory device 704 or otherwise accessible to the processor. Alternatively or additionally, the processor may be configured to execute hard coded functionality. As such, whether configured by hardware or software methods, or by a combination thereof, the processor may represent an entity (e.g., physically embodied in circuitry) capable of performing operations according to an embodiment of the present disclosure while configured accordingly. Thus, for example, when the processor is embodied as an ASIC, FPGA or the like, the processor may be specifically configured hardware for conducting the operations described herein. Alternatively, as another example, when the processor is embodied as an executor of instructions, the instructions may specifically configure the processor to perform the algorithms and/or operations described herein when the instructions are executed. However, in some cases, the processor may be a processor of a specific device (e.g., an image processing system) configured to employ an embodiment of the present disclosure by further configuration of the processor by instructions for performing the algorithms and/or operations described herein. The processor may include, among other things, a clock, an arithmetic logic unit (ALU) and logic gates configured to support operation of the processor.

The processor 702 (and/or co-processors or any other circuitry assisting or otherwise associated with the processor) may be in communication with memory 704 via a bus for passing information among components of the UE 700. The memory 704 may be non-transitory and may include, for example, one or more volatile and/or non-volatile memories. In other words, for example, the memory device may be an electronic storage device (e.g., a computer readable storage medium) comprising gates configured to store data (e.g., bits) that may be retrievable by a machine (e.g., a computing device like the processor). The memory 704 may be configured to store information, data, content, applications, instructions, or the like for enabling the apparatus to carry out various functions in accordance with an example embodiment of the present disclosure. For example, the memory 704 could be configured to buffer input data for processing by the processor. Additionally or alternatively, the memory device could be configured to store instructions for execution by the processor.

The communication interface 706 may be any means such as a device or circuitry embodied in either hardware or a combination of hardware and software that is configured to receive and/or transmit data from/to a network. In this regard, the communication interface may include, for example, an antenna (or multiple antennas) and supporting hardware and/or software for enabling communications with a wireless communication network. Additionally or alternatively, the communication interface may include the circuitry for interacting with the antenna(s) to cause transmission of signals via the antenna(s) or to handle receipt of signals received via the antenna(s). In some environments, the communication interface may alternatively or also support wired communication. As such, for example, the communication interface may include a communication modem and/or other hardware/software for supporting communication via cable, digital subscriber line (DSL), universal serial bus (USB) or other mechanisms.

The UE 700 may also include a housing that contains one or more transmitters and one or more receivers to allow transmission and reception of data. The transmitter(s) and receiver(s) may be combined into one or more transceivers 708. One or more antennas 722 are attached to the housing and electrically coupled to the transceiver 708. The UE 700 may also include a digital signal processor (DSP) 710 for use in processing signals.

Referring now to FIG. 8, FIG. 8 is a flowchart illustrating a workflow of the UE 700 in accordance with an example embodiment. At block 800, the UE 700 transmits, for example by using means such as the processor 702, a location registration request message to an access and mobility management function (AMF) or a mobility management entity (MME) through a radio access network (RAN).

Additionally or alternatively the UE 700 receives, for example by using means such as the processor 702, a registration request message, an attach request message, a tracking area update request message, or the like. These messages comprising information related to location registration to the AMF or MME through the RAN. As such, the registration request message, attach request message, tracking area update request message and similar terms may be used interchangeably to refer to messages comprising information related to location registration, transmitted, received and/or stored in accordance with embodiments of the present invention. Thus, use of any such messages above need to not be taken to limit the spirit and scope of embodiments of the present invention.

In an example embodiment, the UE 700, for example by using means such as the processor 702, indicates its support for RACS to AMF using UE MM Core Network Capability. For example, a UE that supports RACS and stores an applicable UE radio capability ID for the current UE Radio Configuration in the PLMN shall signal the UE radio capability ID in the initial registration procedure. If both a PLMN assigned ID for the current PLMN and a UE manufacturer ID are both stored in the UE and applicable in the PLMN, the UE shall signal the PLMN assigned UE radio capability ID in the registration request message.

The UE 700 identifies, for example by using means such as the processor 702, at block 810, a current user equipment radio configuration associated with the registration request. In an example embodiment, the UE 700 may, for example by using means such as the processor 702, change user equipment radio configuration during a registration procedure in response to the UE 700 interacting with the UE Man-Machine-Interface (MMI) to turn off or turn on 5G or 4G, for example.

After the UE 700 transmits the location registration request, the UE 700 receives, for example by using means such as the processor 702, a registration accept message comprising a user equipment radio capability identification (ID), at block 812. In an example embodiment, the UE 700 receives the registration accept message from the RACS-capable network.

Additionally or alternatively, UE 700 receives, for example by using means such as the processor 702, a registration accept message, an attach accept message, a tracking area update accept message, an user equipment configuration update command message, a globally unique temporary ID (GUTI) reallocation command message, or the like. As such, the registration accept message, attach accept message, tracking area update accept message, user equipment configuration update command message, GUTI reallocation command message and similar terms may be used interchangeably and transmitted, received and/or stored in accordance with embodiments of the present invention. Thus, use of these messages need to not be taken to limit the spirit and scope of embodiments of the present invention.

In circumstances where the registration accept message indicates instructions to operate according to a user equipment manufacturer ID, the UE using means such as the processor 702 may delete stored public land mobile network (PLMN) assigned IDs and re-register using the user equipment manufacturer ID associated with the current user equipment radio configuration as the user equipment radio capability ID as shown in block 814. In an example embodiment, the UE 700 may, for example by using means such as the processor 702, delete or erase all PLMN assigned IDs for the respective PLMN and thereafter will immediately register using the UE manufacturer ID. The UE 700 will, for example by using means such as the processor 702, continue operating using the UE manufacturer ID until the UE 700 receives an indication to operate with a PLMN assigned ID.

In circumstances where the registration accept message indicates instructions to operate according to a PLMN assigned ID, the UE 700 associates, using means such as the processor 702, the PLMN assigned ID to the current user equipment radio configuration as shown in block 816. In an example embodiment, the UE 700 may, for example by using means such as the processor 702, wait for the network to provide the UE radio capability identification and upon receipt, the UE 700 is configured to associate the UE radio capability identification with the current UE radio configuration. Additionally or alternatively, if the UE radio capability ID was provided in the registration accept message, then the indication to operate with the PLMN assigned ID is implicit by the assignment of the PLMN assigned ID. Accordingly, the UE 700 will, for example by using means such as the processor 702, continue to operate using the PLMN assigned ID until the UE 700 receives an indication to operate with the UE manufacturer ID.

As described above, FIGS. 6A, 6B, and 8 are flowcharts of an apparatus 10, method, and computer program product according to an example embodiment of the disclosure. It will be understood that each block of the flowchart, and combinations of blocks in the flowcharts, may be implemented by various means, such as hardware, firmware, processor, circuitry, and/or other devices associated with execution of software including one or more computer program instructions. For example, one or more of the procedures described above may be embodied by computer program instructions. In this regard, the computer program instructions which embody the procedures described above may be stored by a memory device 14 of an apparatus employing an embodiment of the present disclosure and executed by a processor 12 of the apparatus. As will be appreciated, any such computer program instructions may be loaded onto a computer or other programmable apparatus (e.g., hardware) to produce a machine, such that the resulting computer or other programmable apparatus implements the functions specified in the flowchart blocks. These computer program instructions may also be stored in a computer-readable memory that may direct a computer or other programmable apparatus to function in a particular manner, such that the instructions stored in the computer-readable memory produce an article of manufacture, the execution of which implements the function specified in the flowchart blocks. The computer program instructions may also be loaded onto a computer or other programmable apparatus to cause a series of operations to be performed on the computer or other programmable apparatus to produce a computer-implemented process such that the instructions which execute on the computer or other programmable apparatus provide operations for implementing the functions specified in the flowchart blocks.

A computer program product is therefore defined in those instances in which the computer program instructions, such as computer-readable program code portions, are stored by at least one non-transitory computer-readable storage medium with the computer program instructions, such as the computer-readable program code portions, being configured, upon execution, to perform the functions described above, such as in conjunction with the flowchart of FIG. 3. In other embodiments, the computer program instructions, such as the computer-readable program code portions, need not be stored or otherwise embodied by a non-transitory computer-readable storage medium, but may, instead, be embodied by a transitory medium with the computer program instructions, such as the computer-readable program code portions, still being configured, upon execution, to perform the functions described above.

Accordingly, blocks of the flowcharts support combinations of means for performing the specified functions and combinations of operations for performing the specified functions for performing the specified functions. It will also be understood that one or more blocks of the flowcharts, and combinations of blocks in the flowcharts, may be implemented by special purpose hardware-based computer systems which perform the specified functions, or combinations of special purpose hardware and computer instructions.

In some embodiments, certain ones of the operations above may be modified or further amplified. Furthermore, in some embodiments, additional optional operations may be included. Modifications, additions, or amplifications to the operations above may be performed in any order and in any combination.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Although specific terms are employed herein, they are used in a generic and descriptive sense only and not for purposes of limitation.

What is claimed is:

1. A method comprising:
receiving, from a user equipment, a registration request message comprising information related to location registration to an access and mobility management function (AMF) or a mobility management entity (MME) through a radio access network (RAN);
obtaining an international mobile equipment identity (IMEI) or permanent equipment identifier (PEI) of the user equipment and extracting a type allocation code (TAC) from the IMEI or the PEI;
obtaining a user equipment radio capability identification (ID) associated with the user equipment;
determining whether the user equipment radio capability ID is a user equipment manufacturer ID or a public land mobile network (PLMN) assigned ID;
comparing the user equipment's TAC with a list of TACs enabled to operate according to a respective user equipment manufacturer ID of a plurality of user equipment manufacturer IDs;
in circumstances where the user equipment's TAC appears on the list and the user equipment's user equipment radio capability ID is the public land mobile network (PLMN) assigned ID:
constructing a registration accept message, wherein the registration accept message includes instructions for the user equipment to: 1) operate based on the user equipment manufacturer ID, 2) delete PLMN assigned IDs the user equipment stores for respective PLMNs and 3) trigger the user equipment to register with the user equipment manufacturer ID associated with a current user equipment radio configuration;
in circumstances where the user equipment's TAC does not appear on the list and the user equipment's user equipment radio capability ID is the user equipment manufacturer ID:
constructing the registration accept message, wherein the registration accept message includes instructions for the user equipment to operate based on the PLMN assigned ID; and
transmitting the registration accept message to the user equipment.

2. The method according to claim 1, further comprising:
in circumstances where the user equipment's TAC does not appear on the list and the user equipment's user equipment radio capability ID is not determined:
assigning the PLMN assigned ID and constructing the registration accept message, wherein the registration accept message includes instructions for the user equipment to operate based on the PLMN assigned ID; and
in circumstances where the user equipment's TAC appears on the list and the user equipment's user equipment radio capability ID is not determined:
constructing the registration accept message, wherein the registration accept message includes instructions for the user equipment to operate based on the user equipment manufacturer ID.

3. The method according to claim 1, further comprising:
storing the assigned PLMN assigned ID as the user equipment radio capability ID along with their associated TACs;
transmitting a notification of a switch from the PLMN assigned ID to the user equipment manufacturer ID and vice-versa for a specific TAC;
when an indication is received to switch to the user equipment manufacturer ID for the specific TAC, removing the specific TAC form the list of TACs enabled to operate according to the respective user equipment manufacturer ID and removing the association of the PLMN assigned ID to the specific TAC;

when the PLMN assigned ID becomes disassociated to any TAC, removing the dissociated PLMN assigned ID from storage; and transmitting a message instruction to a user equipment capabilities management function (UCMF) to store the assigned PLMN assigned ID and associate the assigned PLMN assigned ID to the specific TAC.

4. The method according to claim 1, further comprising:
determining whether to commence assignment of the user equipment manufacturer ID or the PLMN assigned ID by:
obtaining the TAC from the IMEI or the PEI;
identifying a manufacturer identifier of the user equipment based on the TAC; and
verifying the manufacturer identifier with a predetermined list of stored manufacturer identifiers.

5. The method according to claim 1, wherein the user equipment radio capability ID represents the user equipment's radio access capabilities information.

6. The method according to claim 1, wherein the registration request message indicates that the user equipment supports user equipment radio capability signaling (RACS).

7. The method according to claim 1, further comprising:
providing the instructions for the user equipment to operate based on the PLMN assigned ID via a user equipment configuration update message.

8. The method according to claim 1, wherein a mapping between the user equipment radio capability ID and its corresponding user equipment's radio access capabilities information is stored as a dictionary entry in a network function or node.

9. The method according to claim 8, wherein a user equipment capabilities management function (UCMF) stores the user equipment radio capability ID mappings in the PLMN and is configured to assign PLMN assigned IDs in the PLMN.

10. The method according to claim 8, wherein the RAN caches the user equipment radio capability ID mappings.

11. The method according to claim 8, further comprising:
querying the AMF for the mapping of the user equipment radio capability ID to the corresponding user equipment's radio access capabilities information, wherein querying the AMF for the mapping of the user equipment radio capability ID to the corresponding user equipment's radio access capabilities information comprises the AMF providing the user equipment radio capability ID to a user equipment capabilities management function (UCMF) to obtain the corresponding user equipment's radio access capabilities information.

12. An apparatus comprising at least one processor and at least one memory including computer program code for one or more programs, the at least one memory and the computer program code configured to, with the at least one processor, cause the apparatus at least to:
receive, from a user equipment, a registration request message comprising information related to location registration to an access and mobility management function (AMF) or a mobility management entity (MME) through a radio access network (RAN);
obtain an international mobile equipment identity (IMEI) or permanent equipment identifier (PEI) of the user equipment and extract a type allocation code (TAC) from the IMEI or the PEI;
obtain a user equipment radio capability identification (ID) associated with the user equipment;
determine whether the user equipment radio capability ID is a user equipment manufacturer ID or a public land mobile network (PLMN) assigned ID;
compare the user equipment's TAC with a list of TACs enabled to operate according to a respective user equipment manufacturer ID of a plurality of user equipment manufacturer IDs;
in circumstances where the user equipment's TAC appears on the list and the user equipment's user equipment radio capability ID is the public land mobile network (PLMN) assigned ID:
construct a registration accept message, wherein the registration accept message includes instructions for the user equipment to: 1) operate based on the user equipment manufacturer ID, 2) delete PLMN assigned IDs the user equipment stores for respective PLMNs and 3) trigger the user equipment to register with the user equipment manufacturer ID associated with a current user equipment radio configuration;
in circumstances where the user equipment's TAC does not appear on the list and the user equipment's user equipment radio capability ID is the user equipment manufacturer ID:
construct the registration accept message, wherein the registration accept message includes instructions for the user equipment to operate based on the PLMN assigned ID; and
transmit the registration accept message to the user equipment.

13. The apparatus according to claim 12, wherein the at least one memory and the computer program code configured to, with the at least one processor, cause the apparatus at least to:
in circumstances where the user equipment's TAC does not appear on the list and the user equipment's user equipment radio capability ID is not determined:
assign the PLMN assigned ID and constructing the registration accept message, wherein the registration accept message includes instructions for the user equipment to operate based on the PLMN assigned ID; and
in circumstances where the user equipment's TAC appears on the list and the user equipment's user equipment radio capability ID is not determined:
construct the registration accept message, wherein the registration accept message includes instructions for the user equipment to operate based on the user equipment manufacturer ID.

14. The apparatus according to claim 12, wherein the at least one memory and the computer program code are configured to, with the at least one processor, cause the apparatus at least to:
store the assigned PLMN assigned ID as the user equipment radio capability ID along with their associated TACs;
transmit a notification of a switch from the PLMN assigned ID to the user equipment manufacturer ID and vice-versa for a specific TAC;
when an indication is received to switch to the user equipment manufacturer ID for the specific TAC, remove the specific TAC form the list of TACs enabled to operate according to the respective user equipment manufacturer ID and remove the association of the PLMN assigned ID to the specific TAC;

when the PLMN assigned ID becomes disassociated to any TAC, remove the dissociated PLMN assigned ID from storage; and transmit a message instruction to a user equipment capabilities management function (UCMF) to store the assigned PLMN assigned ID and associate the assigned PLMN assigned ID to the specific TAC.

15. The apparatus according to claim 12, wherein the at least one memory and the computer program code configured to, with the at least one processor, cause the apparatus at least to:

determine whether to commence assignment of the user equipment manufacturer ID or the PLMN assigned ID by:

obtain the TAC from the IMEI or the PEI;

identify a manufacturer identifier of the user equipment based on the TAC; and verify the manufacturer identifier with a predetermined list of stored manufacturer identifiers.

16. The apparatus according to claim 12, wherein the user equipment radio capability ID represents the user equipment's radio access capabilities information.

17. The apparatus according to claim 12, wherein the registration request message indicates that the user equipment supports user equipment radio capability signaling (RACS).

18. An apparatus comprising at least one processor and at least one memory including computer program code for one or more programs, the at least one memory and the computer program code configured to, with the at least one processor, cause the apparatus at least to:

transmit a location registration request message to an access and mobility management function (AMF) or a mobility management entity (MME) through a radio access network (RAN);

identify a current user equipment radio configuration associated with the location registration request message;

receive a registration accept message comprising a user equipment radio capability identification (ID);

in circumstances where the registration accept message indicates instructions to operate according to a user equipment manufacturer ID:

delete stored public land mobile network (PLMN) assigned IDs and re-register using the user equipment manufacturer ID associated with the current user equipment radio configuration as the user equipment radio capability ID; and in circumstances where the registration accept message indicates instructions to operate according to a PLMN assigned ID:

associate the PLMN assigned ID to the current user equipment radio configuration.

19. The apparatus according to claim 18, wherein the user equipment radio capability ID represents a user equipment's radio access capabilities information.

20. The apparatus according to claim 18, wherein the at least one memory and the computer program code are configured to, with the at least one processor, cause the apparatus at least to:

signal the PLMN assigned ID in the location registration request message when both of the PLMN assigned ID for the current PLMN and the user equipment manufacturer ID are stored in the user equipment and applicable in the PLMN.

* * * * *